Sept. 1, 1959 A. P. ARMINGTON 2,901,846
FOUR-WHEEL DRIVE TRACTOR GRADER
Filed April 22, 1953 5 Sheets-Sheet 1

INVENTOR.
ARTHUR P. ARMINGTON
BY
Hyde, Myer, Baldwin & Doran
ATTORNEYS

Sept. 1, 1959  A. P. ARMINGTON  2,901,846
FOUR-WHEEL DRIVE TRACTOR GRADER

Filed April 22, 1953  5 Sheets-Sheet 4

INVENTOR.
ARTHUR P. ARMINGTON
BY
Hyde, Meyer, Baldwin & Doran
ATTORNEYS

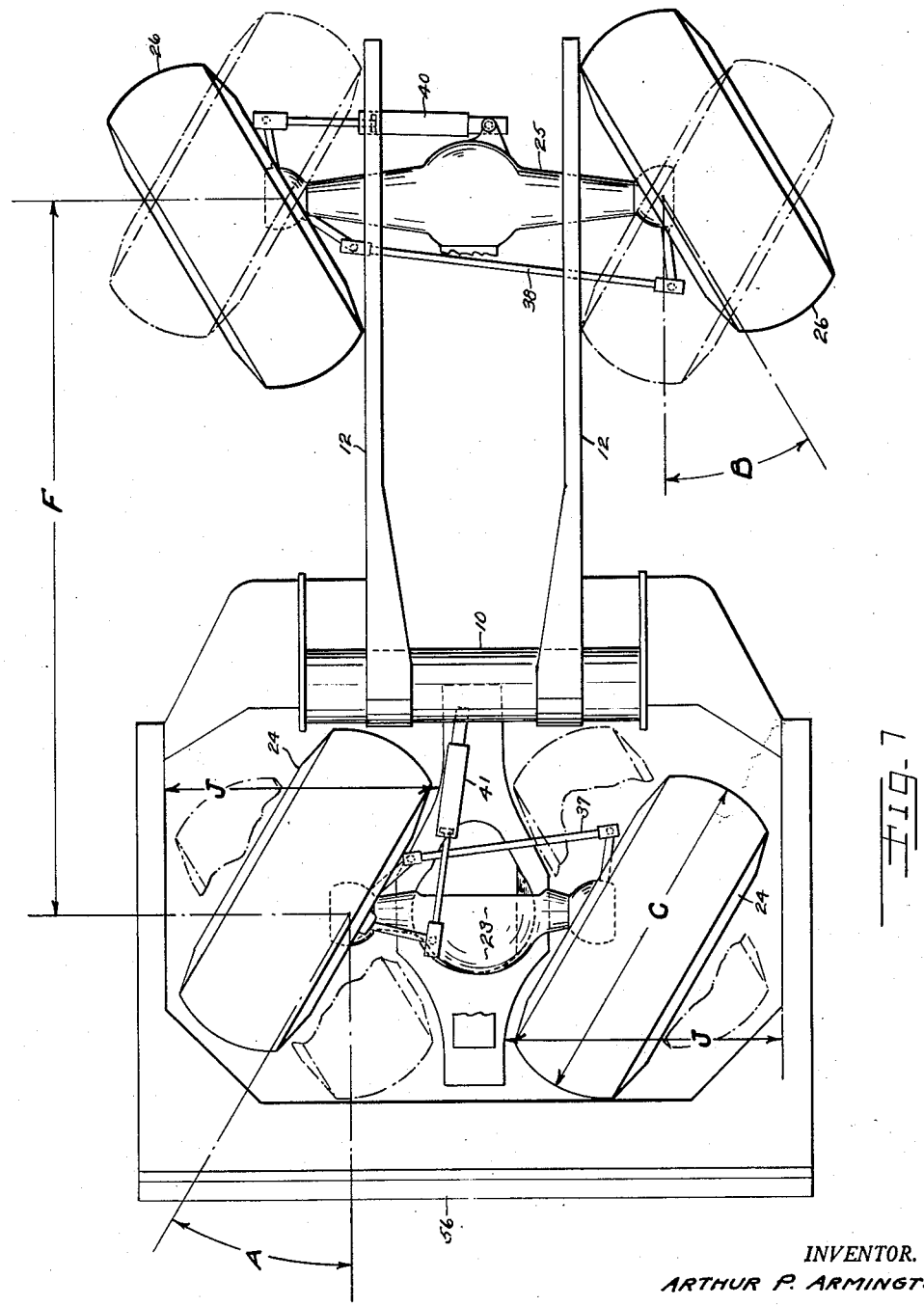

United States Patent Office 2,901,846
Patented Sept. 1, 1959

2,901,846

FOUR-WHEEL DRIVE TRACTOR GRADER

Arthur P. Armington, Willoughby, Ohio, assignor, by mesne assignments, to General Motors Corporation, Detroit, Mich., a corporation of Delaware Application April 22, 1953, Serial No. 350,446

8 Claims. (Cl. 37—144)

This invention relates to improvements in a vehicle and more particularly to a bulldozer type four-wheel tractor.

One of the objects of the present invention is to provide a vehicle with a compact front end design with the front wheels therein mounted for steering, driving and/or tilting.

Another object of the present invention is to provide a vehicle having one or more of the following features either separately or in combination: four-wheel drive; four-wheel steer; fixed rear axle and tiltable front axle; motor mounted in the rear; a bulldozer blade mounted in front of the tiltable front axle, the front wheels closer together than the rear wheels; and/or bulldozer hoist means.

Other features of this invention reside in the arrangement and design of the parts for carrying out their appropriate functions.

Other objects and advantages of this invention will be apparent from the accompanying drawings and description and the essential features will be set forth in the appended claims.

In the drawings—

Figure 1:
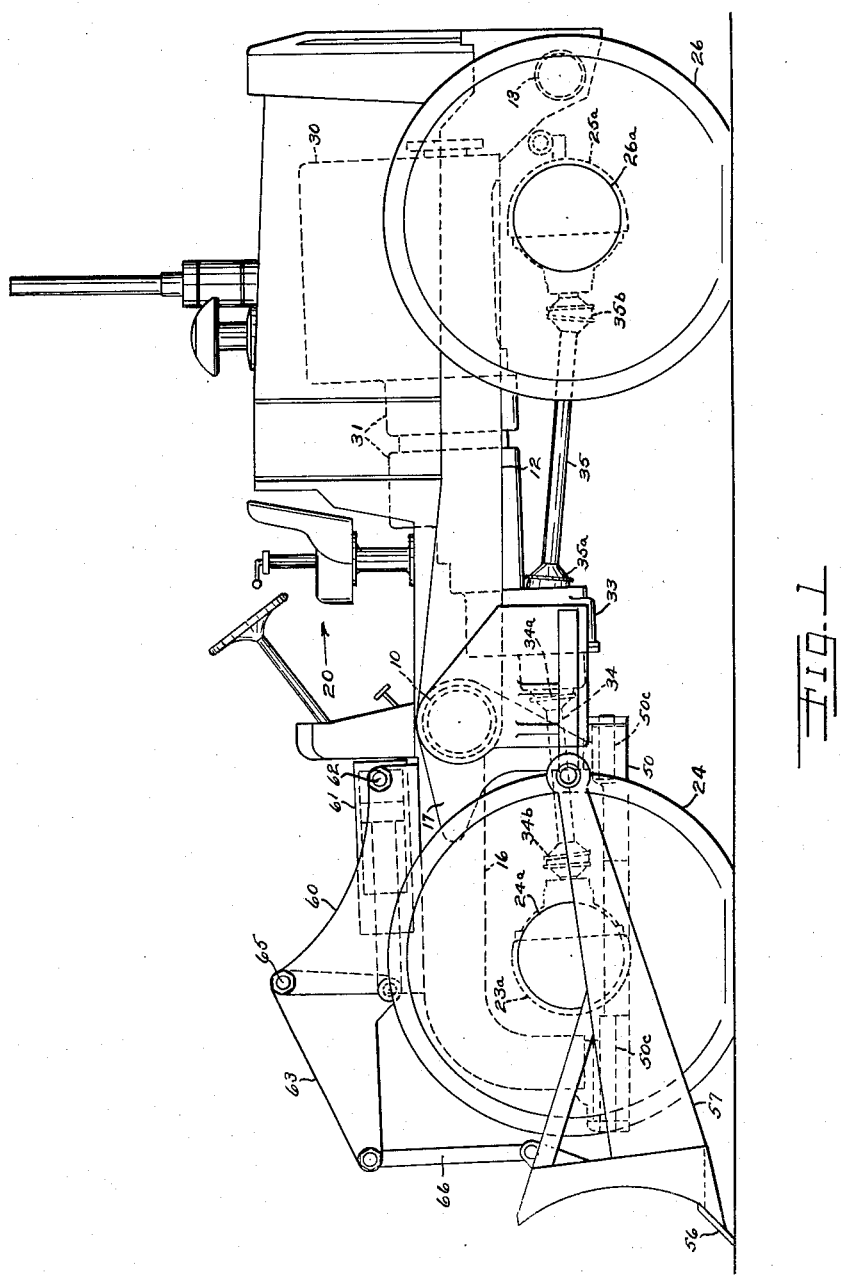
Fig. 1 is a side elevational view of the bulldozer type four-wheeled tractor of the present invention.
Figure 2:
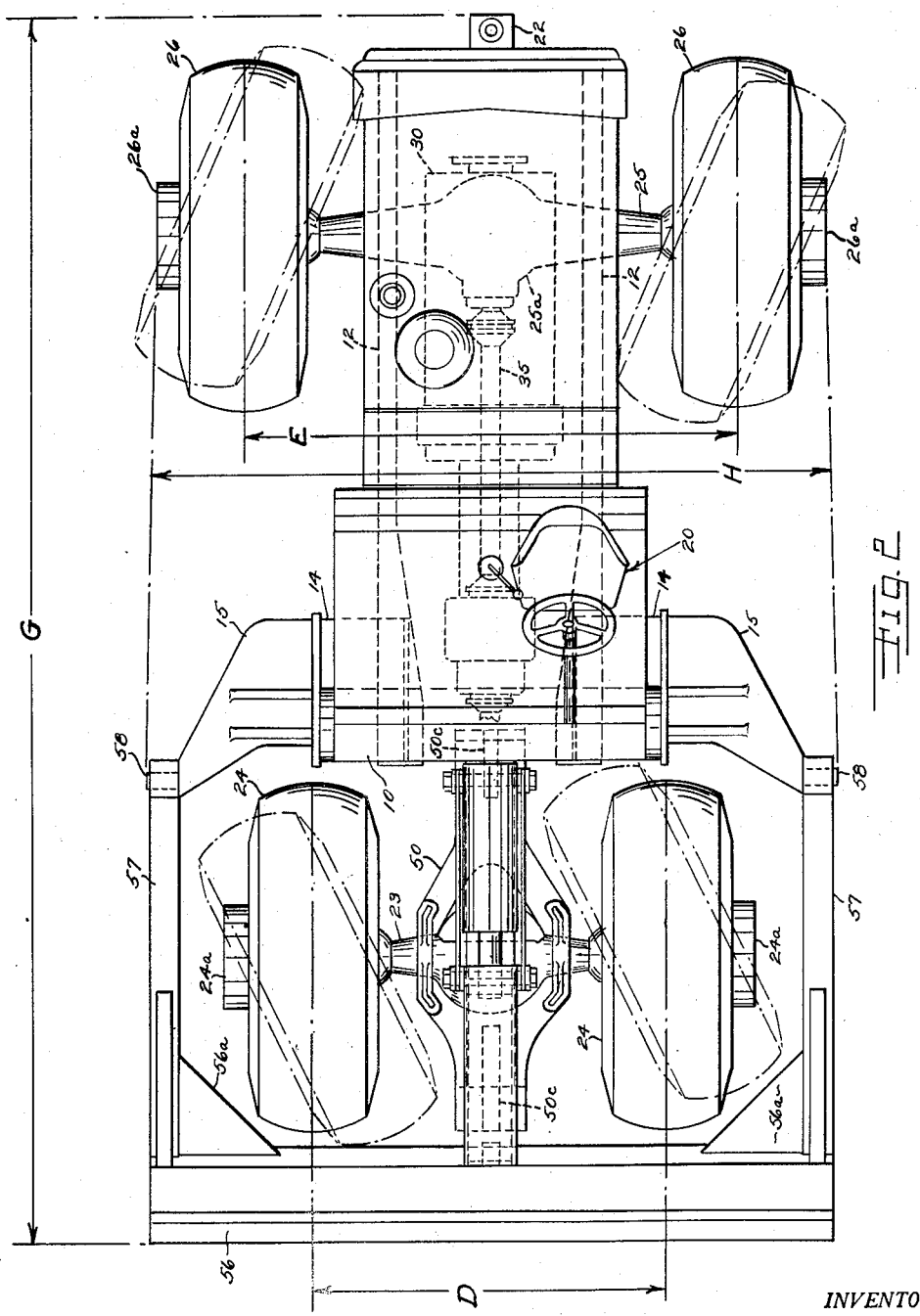
Fig. 2 is a top view of the tractor shown in Fig. 1 with some of the dimensions shown thereon.
Figure 6:
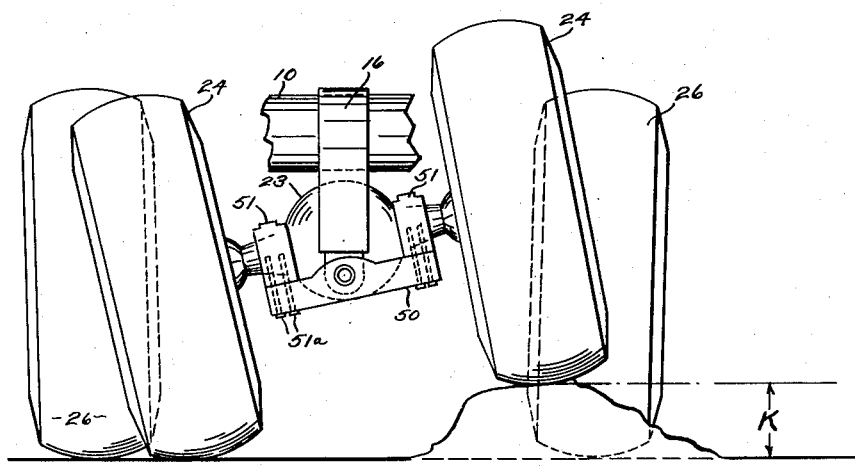

Fig. 6 is a front view of both front wheels and their axle housing and of both rear wheels when the front wheels are going over a maximum height bump; while Fig. 7 is a schematic top view, similar to Fig. 2, including the power steering purposely omitted from the Fig. 2 view, and also including some of the remaining major dimensions of the bulldozer type four-wheel drive and steer off-the-highway tractor.

It should be readily understood that many features of the present invention are applicable to the broad class of vehicles, but I have chosen to illustrate the present invention by describing in detail a bulldozer type four-wheel drive and four-wheel steer tractor.

The tractor frame is preferably of all welded construction with a main frame portion comprising a laterally extending torque tube 10, at least partially tubular construction, to which are welded rearwardly directed and laterally spaced, approximately parallel frame rail members secured to the torque tube at their forward ends and connected together by a bridge member 13 at their rearward ends adjacent the rear axle. These rail members 12, 12 in Fig. 2 are shown as being spaced apart approximately the inner width of the front wheels. The torque tube 10 is also provided with lateral extensions, as shown in Fig. 2, to which the bulldozer push beams are mounted. Each of these extensions is a box construction 14 secured to the outer end of the torque tube. A narrow frame arm 16 (Figs. 3 and 4) is secured at the transverse mid-point of the torque tube 10 and extends generally in the fore-and-aft direction and is provided with a downwardly bent forward distal end, as shown in Figs. 1 to 4. Dependent plates 17, 17 conform to and are secured to the torque tube 10 while straddling the rear end of narrow arm 16 to form a frame strut member generally in vertical longitudinal alignment with this narrow arm.

An operator station at 20 is located adjacent any necessary tractor driving control means. A drawbar 22 is secured to the bridge member 13 connected to the rearwardly extending rail members 12, 12.

The tractor includes a front axle housing 23 having rotatably mounted therein a front axle located below the frame arm 16 at the front of the frame with a pair of front wheels 24, 24 on opposite ends of this front axle and straddling arm 16. A rear axle housing 25, having a rear axle rotatably mounted therein, is fixed to the rearward end of the rail members 12, 12 with rear wheels 26, 26 on its opposite ends. Since a tractor is stabilized by the rear wheels, it is important that they be wide apart as possible and that the vehicle be stabilized by the axle farthest away from the bulldozer blade. This stability is important when bulldozing over the edge of a bank. The front wheels, at the left in Fig. 2, are closer together than the rear wheels. This construction eliminates ruts and provides better compaction of fresh fills or soft soil. For a front-mounted earth moving means, this calls for a minimum width since the overall width of the front of the tractor is approximately the same as the overall width of the rear of the tractor.

The front and rear wheels 24 and 26 have been described as wheels, but it should be apparent that any rolling support means of an equivalent nature, such as short crawler tracks, could be used and could be substituted wherever possible and desirable.

The tractor in the present application is of the type with a four-wheel drive and a four-wheel steer. A drive motor 30 is mounted on the frame rail members 12, 12 at the rear of the tractor to drive the transmission and torque converter 31 in Fig. 1 which in turn drives a gear box 33. The gear box 33 drives the front wheels 24, 24 and rear wheels 26, 26 respectively through axle drive shafts 34, 35 respectively provided with universal joints 34a, 34b, 35a, 35b for driving said axles through front and rear drive gear boxes 23a, 25a, located at their respective axle housing mid-points. Each wheel is shown as provided with a drive mechanism and steering mechanism of the type disclosed in the copending U.S. patent application, Serial No. 139,947, now abandoned, entitled "Drive Means for Steering Wheels," filed by Walter F. Double on January 21, 1950. Each wheel has a planetary gear drive 24a or 26a in Fig. 2 corresponding to the planetary gear drive shown in Fig. 4 of the aforementioned copending patent application. Each pair of wheels, the front pair and rear pair, is steered separately by having the wheels in each respective pair cross-connected by a tie rod 37 or 38 in Fig. 7 corresponding to cross-bar or tie rod 59 in the aforementioned patent application, while the steering arm, corresponding to the steering arm 56 in the aforementioned patent application, is connected to hydraulic power steering cylinder 40 or 41 in Fig. 7. The tractor in the present application can be steered by a power steering arrangement with the steering wheels and pedals controlled from the operator's seat by means of the power steering apparatus disclosed in the copending U.S. patent application, Serial No. 350,445, filed on April 22, 1953, by Arthur P. Armington and George E. Armington, entitled "Steering Arrangement for Tractor," now Patent No. 2,783,849. The hydraulic power steering cylinders 40 and 41 in the application corresponds with cylinders 17 and 117 in this last mentioned copending patent application.

Figure 3:
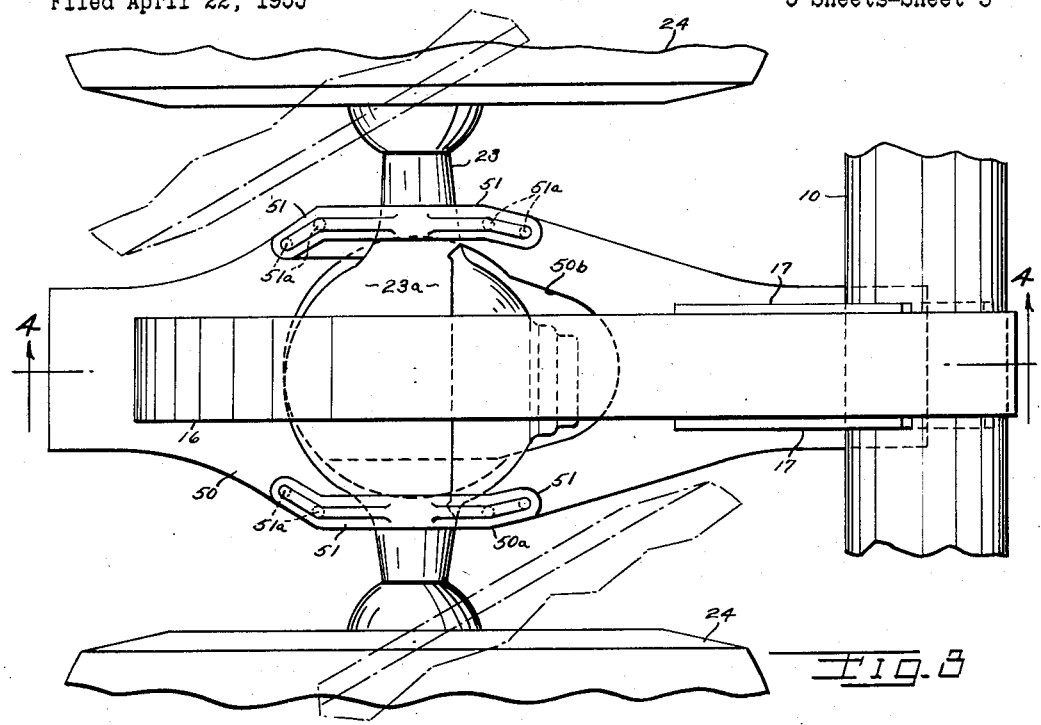
Fig. 3 is an enlarged top plan partial view of the front axle pivotal mount including the front axle with its axle housing, the support member therefor, and the frame arm and frame dependent portions for pivotally supporting this support member.
Figure 4:
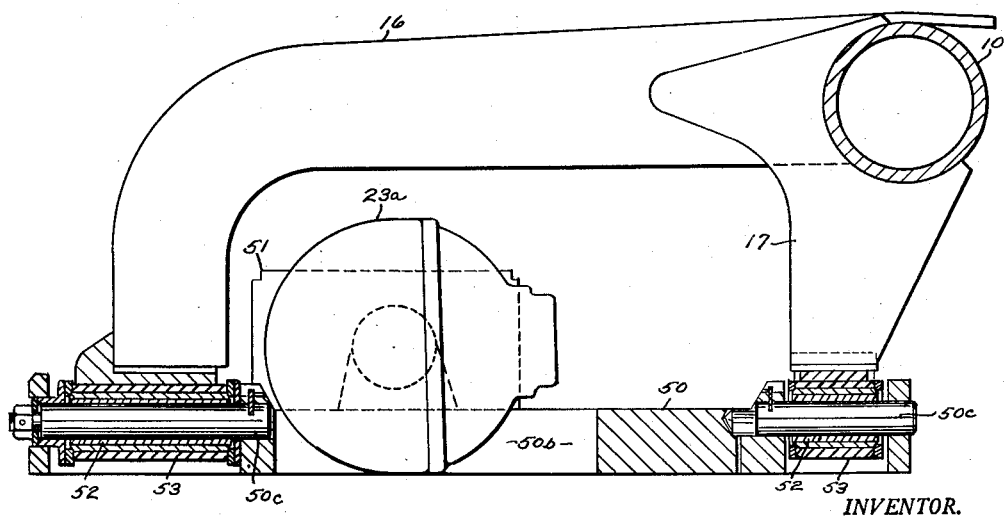
Fig. 4 is a longitudinal vertical sectional view through the support member and the two pivotal mounts along the line 4—4 of Fig. 3.

Means is provided for pivotally mounting the front axle 23 and its axle housing to the frame for rocking about an axis extending fore-and-aft with respect to the frame so as to accommodate the front wheels to uneven ground. This means comprises a support member 50 in Figs. 1, 2, 3 and 4 having a widened portion 50a intermediate its fore-and-aft ends generally diamond-shaped in plan view with a cut-out central portion 50b surrounding and cradling the drive gear box 23a, with the front axle housing 23 and its axle extending laterally outwardly from the support member 50. The support member 50 is secured to the front axle housing 23 in any suitable manner to provide strength and proper connection between them. The drawings illustrate in Figs. 3, 4 and 6 clamp plates 51, 51 with each clamp plate having a cut-out (Fig. 4) with an arcuate bottom snugly straddling over housing 23 on one side of the differential gear box 23a with a bottom face secured to the top of the widened support member portion 50a by bolts 51a (Figs. 3 and 6) with each bolt extending upwardly through a hole in support member 50 into an aligned tapped hole in the bottom face of its associated clamp plate 51. Bolts 51a have been eliminated in Figs. 4 for clarity. It should be noted that since the wide, generally diamond shape portion 50a of the support member 50 surrounds and cradles the front drive gear box 23a, this nesting structure provides a high center clearance, always necessary in good tractor design, while the fore-and-aft ends of the support member 50 are of narrow width to provide adequate clearance for steering, as shown in Figs. 2 and 3. The opposite ends of the surpport member 50 have pivot pins 50c, 50c in Fig. 4, either secured thereto or formed integral therewith, with each of these pins rotatably mounted in a bearing sleeve 52 held in place by a removable bearing cap 53 coacting with and connected to the top of the bearing housing formed by either the lower front distal end of arm 16 or the housing connecting the bottom of the dependent plates 17, 17 in Fig. 4. This structure provides coaxial pivotal mounts between the forward end of the support member 50 and the downwardly bent distal end of arm 16 as well as between the rearward end of support member 50 and the main frame portion at the bottom of the dependent plates 17, 17. The axes of these pivotal mounts extend generally in the fore-and-aft or the longitudinal direction.

The drive motor 30 has been placed at the back of the tractor to put the major weight over the rear, fixed, stabilizing rear axle. The motor 30 is also placed over the fixed rear axle 25 to leave the maximum possible space adjacent the front axle for oscillation and steering. Therefore, the overall width of the tractor can be kept to a minimum.

When the operator bulldozes dirt over the edge of an embankment, he may allow one of the front wheels to partially go over the edge. Since it is very important that the tractor be kept from tipping when this occurs, it is desirable to stabilize the tractor by the use of a fixed rear axle housing 25 with the weight of motor 30 thereover.

The front of the tractor has earth moving means here shown as comprising a scraper blade 56 positioned ahead of the frame arm 16 and front wheels 24, 24 with rearwardly directed push beams 57, 57 secured to the outer ends of said blade 56 and straddling the front wheels 24, 24. The word "blade" as used in this specification and claims is meant to include any implement used on the front of a tractor of the earth moving type, such as a blade, a scoop, a back-drag grading blade, a back-rip scarifying teeth, stump and rooter teeth, and other equivalent structure used in this location.

Each push beam 57 is pivotally mounted at its rearward end on a pivot 58 to one of the brackets 15 with the shape of the bracket 15 adding strength to the construction. This causes the rearward forces exerted by the push beams 57, 57 to be closely directed against and substantially in line with the wide main frame portion and the torque tube 10 that is purposely designed to absorb these forces.

Figure 5:
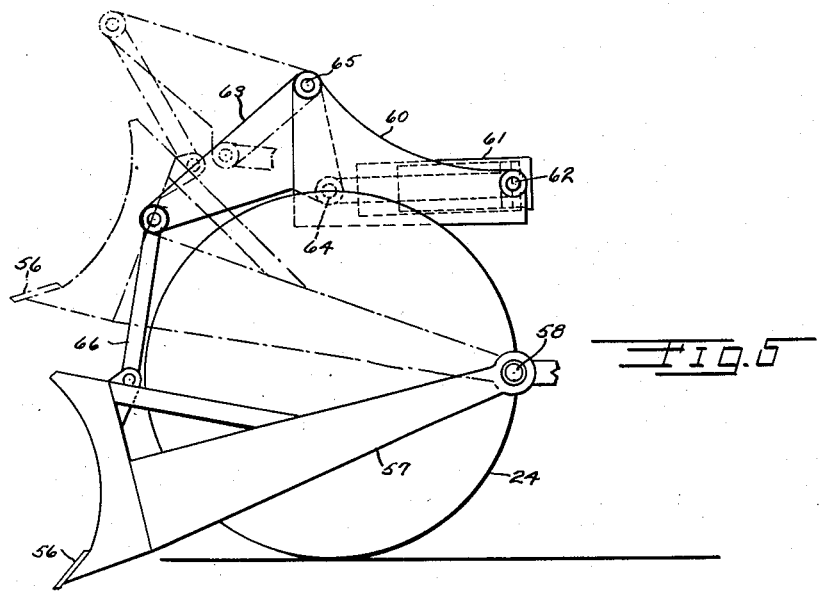
Fig. 5 is a side elevational view of the bulldozer scraper blade, push beams with their pivotal mounts, and the hoist secured to the forwardly protruding frame arm with the scraper blade shown in different positions by solid and dot-dash lines while the periphery of the front wheels is shown in solid lines.

There is provided blade operating means which is here shown as a hoist means on the arm 16 for raising and lowering the blade 56. The frame arm 16 has secured thereto an upwardly projecting bracket 60 in Figs. 1 and 5 with approximately parallel longitudinally extending walls between which a hydraulic hoist 61 is pivotally mounted at 62 at one end while being pivotally connected at 64, at the other end, to one arm of a bell crank 63, which bell crank 63 is pivotally mounted at 65 to and between the parallel walls of the bracket 60. A link 66 is pivotally secured at opposite ends to the front of the bell crank 63 and to the top of the scraper blade 56. When the hydraulic hoist 61, consisting of telescopic cylinder and piston members, is increased in length, the scraper blade 56 is raised, as shown in Fig. 5, while a decrease in hoist length will cause a corresponding lowering of the blade 56.

The approximate maximum front wheel tilt is shown in Fig. 6. The front wheels are mounted with sufficient steerable clearance for maximum turning to 30 degrees on either side of a straight ahead position between the support member 50 and the push beams 57, 57 as shown by dimension A in Fig. 7. The rear wheels are each steerable to a maximum angular position B on each side of a straight ahead position with B being 23.5 degrees in the present disclosure. A satisfactory working range of steering dimensions A and B would be between 20 degrees and 30 degrees with these large, off-the highway tires in a bulldozer type tractor. It should be noted that the locus of the inner faces of the two front wheels, in their maximum steering positions, defines roughly a diamond shape as indicated in Fig. 7 by the inner halves of the wheels in full lines and their fragmentary showing in dot-dash lines where steering oppositely. This diamond shape of the front wheel locus is similar to and straddles the generally diamond-shape widened portion 50a on the support member 50 with the inner and outer ends of each of the front wheels in the maximum steering position being approximately equally spaced horizontally from the respective vertical projection of the outer edge of the support member 50 and the vertical projection of the inner edge of its associated push beam 57. The maximum front wheel steering position of the front wheels will, of course, be determined by the shape of the widened portion 50a of the support member.

It should be noted in Fig. 2 that the leading edge of each push beam supporting bracket is beveled inwardly and rearwardly and that the connection between each push beam 57 and the scraper blade 56 is reinforced by a diagonal, connecting brace 56a secured to both the blade and its associated push beam with its diagonal edge facing its associated front wheel and extending generally in the same direction as one side of one of the aforementioned diamond shapes. Note the bracket 15 and the braces 56a are outside of the arcuate steering arcs of the front wheel peripheries so that they will not cause interference but will strengthen the bulldozer construction.

Some of the other dimensions on this particular bulldozer type tractor are also shown in Figs. 2, 6 and 7. The front and rear wheels 24 and 26 are of the same outside diameter since all wheels use in this embodiment a size 24:00 x 25 tire with an approximate 73 inch outside diameter, which is shown as dimension C in Fig. 7. The track or gauge (the distance between the centers of either the front or the rear pair of wheels when in the straight ahead position) is shown by dimension D in Fig. 2 for the front wheels which is 5 feet, 10 inches and by dimension E in Fig. 2 for the rear wheels which is 8 feet, 2½ inches. The wheel base F in Fig. 7, the distance between the front and rear axles, is 12 feet, 6 inches, while the overall length from the front of the scraper blade to the rear of the tractor hitch or drawbar 22 is approximately 21 feet, 7½ inches and is shown by dimension G in Fig. 2. The overall width of the tractor as shown by dimension H in Fig. 2 is 11 feet, 6 inches. The horizontal lateral distance from the outer edge of the support member 50 to the inner edge of the associated push beam 57, as shown by either dimension J in Fig. 7, is approximately 57¼ inches. The pivotal mounting of the support member 50 permits the front axle and its housing 23 to tilt when encountering irregularities on the earth's surface while keeping all four tractor wheels in contact with the ground when one front wheel encounters a maximum bump or depression of approximately 18 inches, as shown by the maximum dimension K in Fig. 6. This is the maximum possible deflection of the tiltable axis in this embodiment. When this maximum deflection occurs, the upper left edge of the left front wheel 24 in Fig. 6 is displaced laterally outwardly approximately 5½ inches from its normal vertical position to reduce the clearance between it and its associated push beam 57 while the upper left edge of right front wheel 24 is displaced laterally inwardly approximately 6¼ inches, so that arm 16 must be narrow.

It should now be apparent that certain ratios exist between these dimensions. The horizontal distance from the support member outer edge adjacent the front wheel periphery to the push beam inner edge (dimension J) is approximately .79 times the diameter of each of the front wheels (dimension C). A satisfactory working range exists when the relationship is between approximately 74% to 84% to allow 5% on each side. The overall tractor and bulldozer width being approximately 1.9 times the front wheel diameter as found by dividing dimension H by dimension C. A satisfactory range is between 1¾ and 2 for this ratio. The wheel base distance between the axles (dimension F) is approximately two times the wheel diameter (dimension C) and a satisfactory working range is between 1¾ and 2½. The ratio of the overall length (dimension G is approximately 3.55 times the wheel diameter (dimension C) and a satisfactory working range exists when this value is between 3 and 4½. The ratio between the horizontal lateral distance between the support member outer edge and the push beam inner edge (dimension J), the diameter of each front wheel (dimension C), the maximum permissible deflection (dimension K) of one of the front wheels from a plane formed by the bottoms of the other front wheel and the back wheels, and the distance between centers of the front wheel tracks (dimension D) respectively approximately bear the relationship 3.2, 4, 1 and 3.9.

The problem of physically working in the four-wheel steer function and still getting a simplified but rigid bulldozer mounting has been solved by my improved design. The bulldozer push beams 57, 57 are as far apart as possible since they straddle the front wheels 24, 24 to provide blade stability while the narrowness of the frame arm 16 as compared to the lateral width of torque tube 10 permits the rearward thrust of the push beam to be more closely directed against the wide main frame portion and torque tube 10 with a minimum of overhang in brackets 15, 15 and this rearward push beam thrust is absorbed in a substantially in-line manner directly against the strongest part of the frame, namely, the torque tube 10.

The front wheels 24, 24 are closer together than the rear wheels 26, 26. This construction permits placing the push beams 57, 57 of the bulldozer approximately within the overall width of the rear wheels 26, 26 to help make possible the compact front end design for a given tractor width. When the tractor works on soft soils or fresh fills, this spacing of the front wheels closer than the rear wheels makes fewer ruts and provides better compaction than when the front and rear tires have the same width track.

It is possible with my improved construction to work the bulldozer on a bias by using the four-wheel steer to run along parallel to a bank while allowing the bulldozer blade to partially overhang the edge of the bank. This cannot be done with any other type of vehicle, to my knowledge, as it requires the combination of the four-wheel steer principle and the closely spaced front wheels.

My invention makes it possible to provide a very efficient machine of the type described wherein a small vehicle may be kept within highway width limits of eight feet, and a larger vehicle may be kept within a width of twelve foot six inches which may be shipped by rail by special permit and special routing.

Various changes in details and arrangement of parts can be made by one skilled in the art without departing from the spirit of this invention or the scope of the appended claims.

What I claim is:

1. A tractor, comprising a frame having a main portion and having a forwardly directed narrow arm extending generally in the fore-and-aft direction with a downwardly extending forward distal end, rolling support means at the rear of said main frame portion, a front axle located below said frame arm, a pair of wheels on the opposite ends of said front axle, means for steering said wheels, a support member secured between said wheels to said front axle intermediate its ends and extending generally in the fore-and-aft direction, said support member obtaining its sole support from and being secured at its forward end only to the downwardly extending distal end of said arm and at its rearward end only to said main frame portion, said arm and support member being divided generally symmetrically by a longitudinally extending vertical plane, the outline of said support member when viewed from the top being generally diamond-shaped including sides extending from the central portion of said support and inclined to the fore and aft direction, the inside surfaces of the wheels in both extreme steer positions being located relatively close to said inclined sides, the width of said arm and the width of said central portion of the support member being less than the distance between said surfaces in horizontal alignment therewith, whereby the distance between said wheels is small for a given wheel size and steer angle.

2. A tractor comprising a frame having a main portion and having a forwardly directed narrow arm extending generally in the fore and aft direction with a downwardly extending forward distal end, rolling support means at the rear of said main frame portion, a front axle located below said frame arm, a pair of wheels on the opposite ends of said front axle, means for steering said wheels, a support member secured between said wheels to said front axle intermediate its ends and extending generally in the fore and aft direction, said support member obtaining its sole support from said being secured at its forward end only to the downwardly extending distal end of said arm and at its rearward end only to said main frame portion, said arm and support member being divided generally symmetrically by a longitudinally extending vertical plane, the outline of said support member when viewed from the top being generally diamond-shaped including sides extending from the central portion of said support and inclined to the fore and aft direction, the inside surfaces of said wheels in both extreme steer positions being located relatively close to said inclined sides, the width of said arm and the width of said central portion of said support member being less than the distance between said inside wheel surfaces in horizontal alignment therewith whereby the distance between said wheels is small for a given wheel size and steer angle, means pivotally mounting said support member at its forward and rearward ends to said arm and main frame portion for rocking said axle about an axis extending in the fore-and-aft direction, the width and location of said arm being constructed to provide a small width between the front wheels and to permit a large axle oscillation about said axis without interference with said arm, a gear box on said axle located within said diamond-shaped outline of said support member and having its major portion located above said pivotal mounts for said support member, power means on said frame for driving said wheels through said gear box, said main frame portion having a laterally extending torque tube of generally tubular construction having said arm secured to its mid-point.

3. A bulldozer type vehicle, comprising a frame having a main portion and having a forwardly directed narrow arm extending from said main portion generally in the fore-and-aft direction with a downwardly extending distal end, rolling supporting means at the rear of said main frame portion, a front axle located below said frame arm, connecting means including support means pivotally mounted on said distal end of said arm and said main frame portion about a longitudinal axis and means for securing said front axle to said support means, a front pair of wheels straddling said arm at the front of said frame on the opposite ends of said front axle and being horizontally and laterally aligned with said arm, earth moving means positioned ahead of said arm and said front wheels with rearwardly directed push beams straddling the front wheels, and means for mounting said push beams on the main frame portion behind said front wheels, said pivotally mounted support means being the connection between said axle and said arm and frame, said arm and said support means lying in a longitudinally extending vertical zone between said wheels, whereby the distance between said push beams will be small.

4. A bulldozer type vehicle, comprising a frame having a main portion and having a forwardly directed narrow arm extending from said main portion generally in the fore-and-aft direction with a downwardly extending forward distal end, rolling support means on said main frame portion, a front axle located below said frame arm, a pair of wheels at the front of said frame on the opposite ends of said front axle straddling said arm but horizontally aligned therewith, means pivotally mounting said front axle to said frame for rocking about an axis extending fore-and-aft with respect to said frame to accommodate the wheels to uneven ground, said last mentioned means comprising a support member secured to said front axle intermediate its ends and extending generally in the fore-and-aft direction and comprising coaxial pivotal mounts between said support member and the downwardly extending distal end of said arm and between said support member and said main frame portion, a bulldozer construction comprising a blade positioned ahead of said frame arm and said front wheels with rearwardly directed push beams straddling the front wheels, said narrow arm providing the sole support for said axle and support member and lying in a longitudinally extending vertical zone being equidistant from said wheels and push beams when said axle is horizontal, means for pivotally mounting said push beams on the main frame portion behind said front wheels, the width and location of said arm and the space between said push beams being constructed to provide a small push beam width and to permit a large axle oscillation about said axis without interference.

5. A bulldozer type tractor, comprising a frame having a main portion and having a forwardly directed narrow arm extending generally in the fore-and-aft direction with a downwardly extending forward distal end, rolling support means at the rear of said main frame portion, a front axle located below said frame arm, a pair of wheels on the opposite ends of said front axle, means for steering said wheels, a support member secured between said wheels to said front axle intermediate its ends and extending generally in the fore-and-aft direction, said support member obtaining its sole support from and being secured at its forward end only to the downwardly extending distal end of said arm and at its rearward end only to said main frame portion, earth moving means positioned ahead of said frame arm and front wheels with rearwardly directed push beams straddling the front wheels with said wheels in turn straddling said arm and support member, means pivotally mounting said push beams to the main frame portion behind said front wheels, said arm and support member being divided generally symmetrically by a longitudinally extending vertical plane, the outline of said support member when viewed from the top being generally diamond-shaped including sides extending from the central portion of said support and inclined to the fore and aft direction, the inside surfaces of said wheels in both extreme steer positions being located relatively close to said inclined sides, the width of said arm and support member being less than the distance between the inside surfaces of said wheels in horizontal alignment therewith, whereby the distance between said push beams is small for a given wheel size and steer angle.

6. The combination set forth in claim 5, including said push beams, earth moving means, said pivotal mounting and said main frame portion forming with their inner edges a generally octagonal opening in the horizontal plane braced at its corners and snugly fitting said wheels in their extreme positions.

7. The combination set forth in claim 5, including means pivotally mounting said support member at its forward and rearward ends to said arm and main frame portion for rocking said axle about an axis extending in the fore-and-aft direction, the width and location of said arm and the space between said push beams being constructed to provide a small push beam width and to permit a large axle oscillation about said axis without interference.

8. The combination set forth in claim 7, including a gear box on said axle intermediate said wheels, power means on said frame for driving said wheels through said gear box, said rolling support means being a rear axle carried by said main frame portion and two rear wheels thereon, each of said front wheels being mounted with sufficient steerable clearance for steering to at least 20 degrees on either side of a straight ahead position between the support member and one of said push beams, the horizontal distance from the outer edge of said support member adjacent the front wheel periphery to the push beam inner edge being approximately .79 of the diameter of each of the front wheels straddled thereby, the overall tractor width being approximately 1.9 times the front wheel diameter, the wheel base distance between said axles being approximately two times the front wheel diameter; the horizontal lateral distance between the support member outer edge and the push beam inner edge, the diameter of each front wheel, the largest permissible deflection from a plane of one of said front wheels while the bottoms of the other front wheel and both said rear wheels form said plane, and the distance between the centers of the front wheel tracks respectively approximately bearing the relationship 3.2, 4, 1, and 3.9; said push beams, earth moving means, said pivotal mounting and said main frame portion forming with their inner edges a generally octagonal opening in the horizontal plane braced at its corners and snugly fitting the locus of said wheels in said extreme positions, said main frame portion having a laterally extending torque tube of generally tubular construction forming the rear edge of said octagonal opening having said arm secured to its mid-point and having said pivot mounting means for said push beams at its opposite ends, and earth moving means operating means operatively connected to said arm between said front wheels and secured to said earth moving means for raising and lowering it.

References Cited in the file of this patent

UNITED STATES PATENTS

| | | | |
|---|---|---|---|
| 533,132 | Landis | | Jan. 29, 1895 |
| 1,178,838 | Brown | | Apr. 11, 1916 |
| 1,535,439 | Ronning et al. | | Apr. 28, 1925 |
| 1,868,648 | Wells et al. | | July 26, 1932 |
| 1,890,649 | Jarmin | | Dec. 13, 1932 |
| 2,160,271 | Kliesrath | | May 30, 1939 |
| 2,195,607 | Wilson et al. | | Apr. 2, 1940 |
| 2,253,745 | Wold | | Aug. 26, 1941 |
| 2,323,817 | Lee | | July 6, 1943 |
| 2,495,310 | Armington | | Jan. 24, 1950 |
| 2,529,208 | Andersen | | Nov. 7, 1950 |
| 2,624,131 | Rockwell | | Jan. 6, 1953 |
| 2,625,232 | Lado | | Jan. 13, 1953 |
| 2,725,650 | Crawford | | Dec. 6, 1955 |
| 2,748,509 | Brown et al. | | June 5, 1956 |

FOREIGN PATENTS

| | | |
|---|---|---|
| 638,455 | Great Britain | June 7, 1950 |
| 345,916 | Italy | Jan. 20, 1937 |